United States Patent

[11] 3,590,725

[72] Inventor Roman Bilynsky
522 East 5th St., New York, N.Y. 10009
[21] Appl. No. 745,525
[22] Filed July 17, 1968
[45] Patented July 6, 1971

[54] CONTINUOUS ELECTRIC ROASTING OF ELONGATED MEAT STRANDS AND OTHER FOOD STRANDS AND FOOD ROASTING SYSTEMS THEREFOR
8 Claims, 20 Drawing Figs.
[52] U.S. Cl..................................................... 99/334,
99/107, 99/355, 99/358, 219/383
[51] Int. Cl...................................................... A47j 27/00
[50] Field of Search........................................... 99/107,
334, 352, 353, 355, 356, 358, 253, 274, 441;
219/383, 388

[56] References Cited
UNITED STATES PATENTS
| | | | |
|---|---|---|---|
| 2,054,937 | 9/1936 | Kremer | 99/358 X |
| 2,208,651 | 7/1940 | Wallace | 99/441 X |
| 2,789,914 | 4/1957 | Davis | 99/441 UX |
| 2,953,461 | 9/1960 | Prohaska | 99/352 X |
| 3,116,680 | 1/1964 | Neumann | 99/441 X |
| 3,235,388 | 2/1966 | Francis | 99/355 UX |

FOREIGN PATENTS
| | | | |
|---|---|---|---|
| 957,179 | 1/1957 | Germany | 99/353 |

Primary Examiner—Billy J. Wilhite
Attorney—Ostrolenk, Faber, Gerb and Soffen

ABSTRACT: A method for the continuous electric roasting of an elongated meat strand in a uniform manner which includes an oven system having means for passing electric current axially and partly transversely through successive sections of the meat strand while it is being advanced. The continuous meat strand may typically have a diameter in excess of 3 inches.

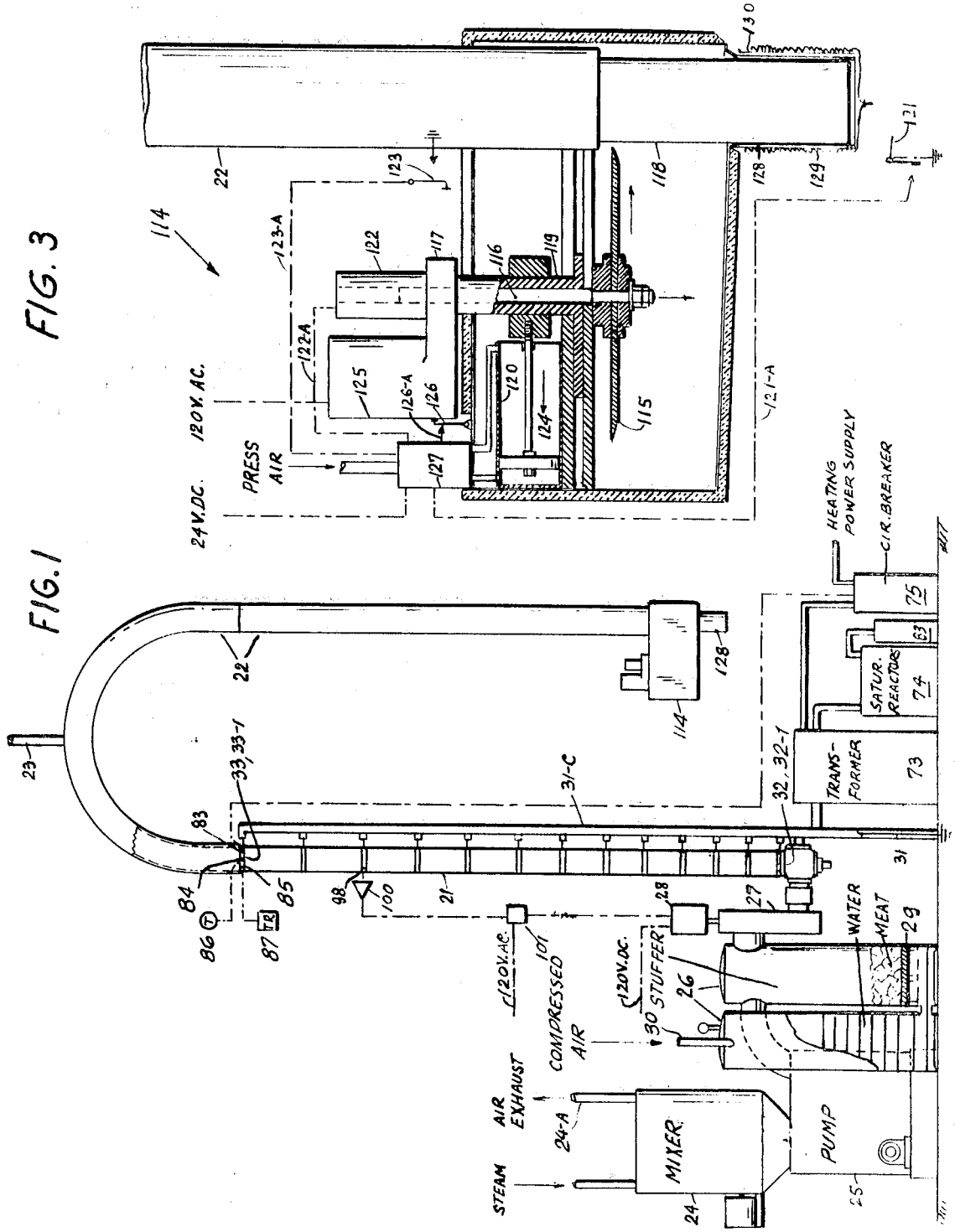

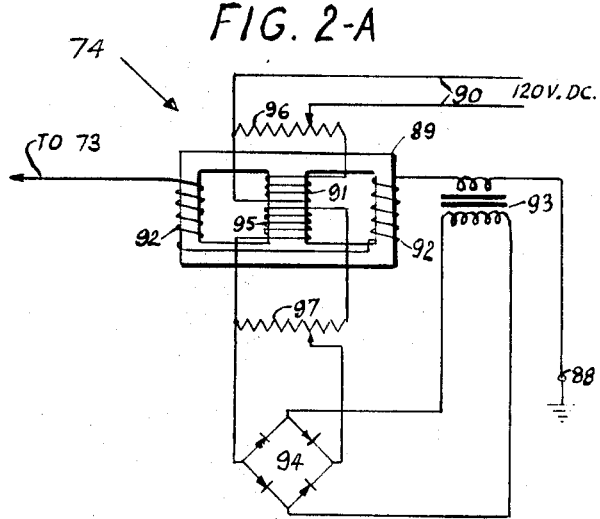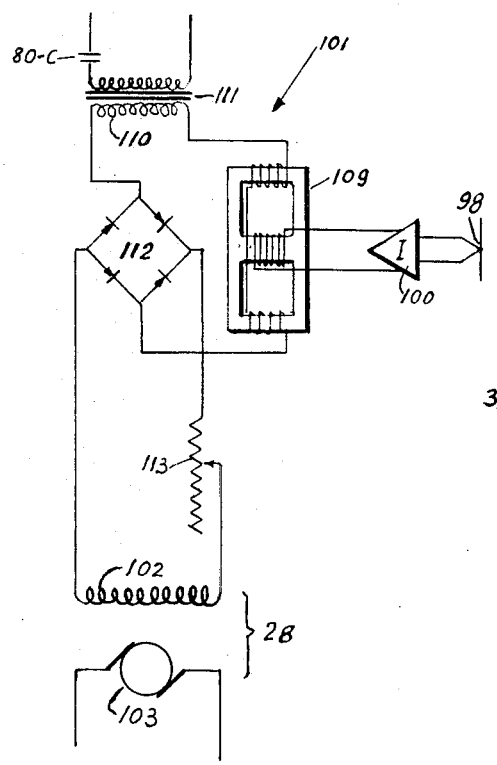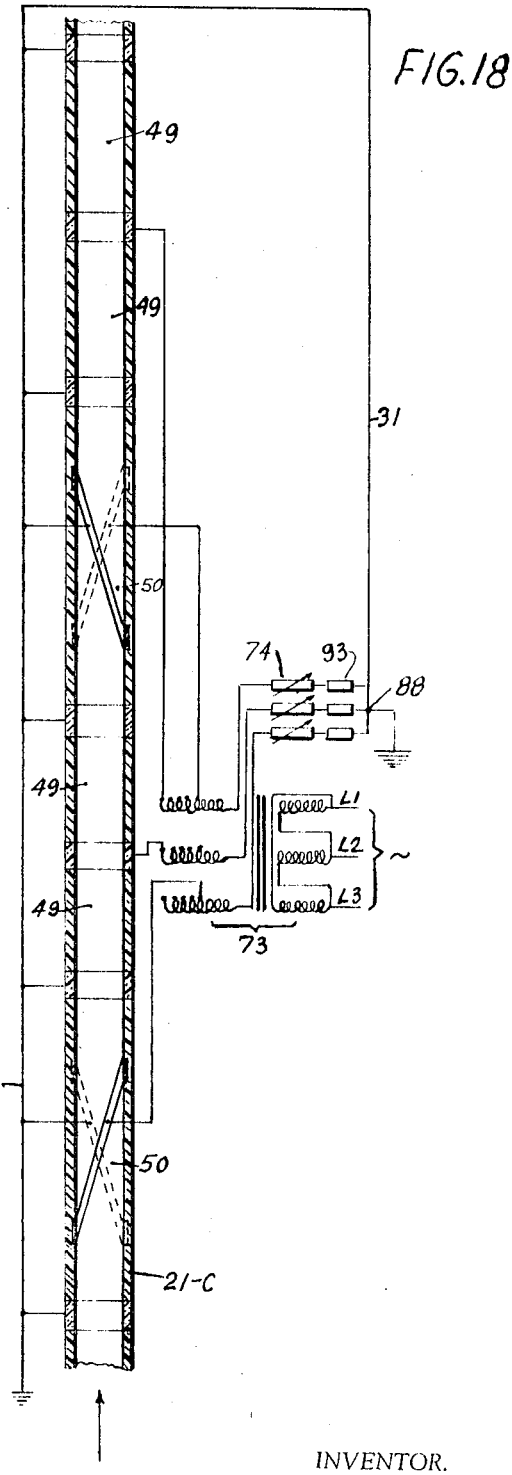

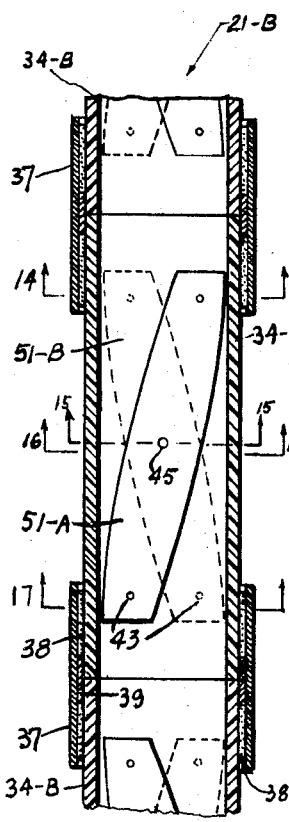
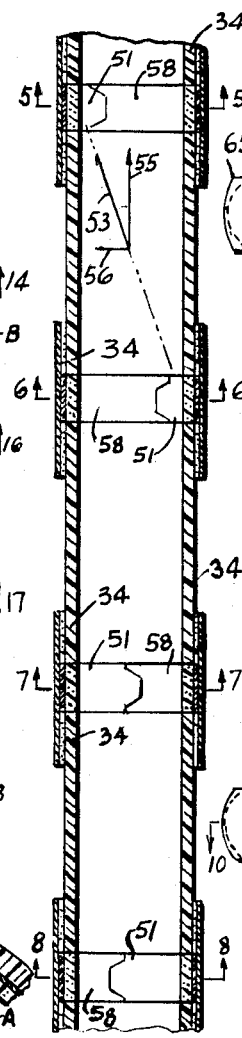
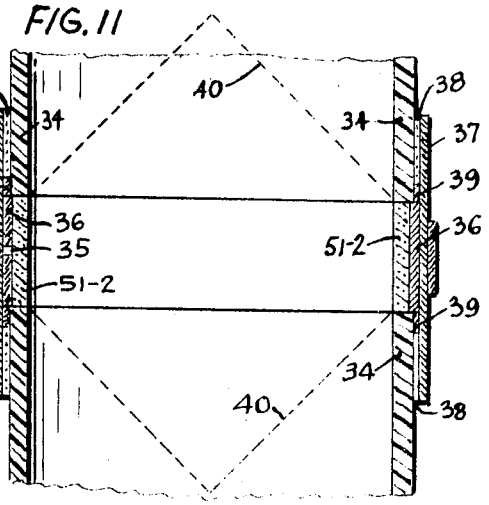
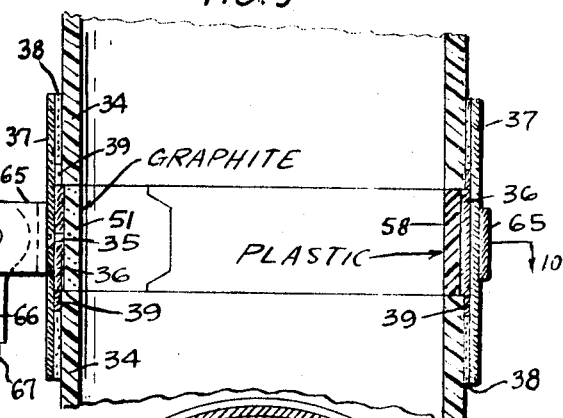
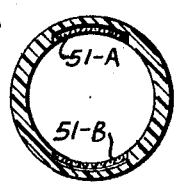
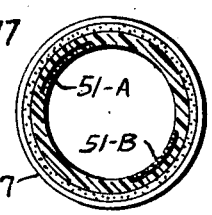
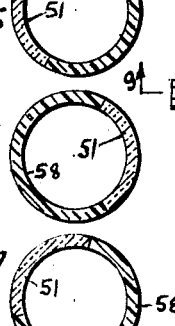
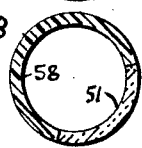
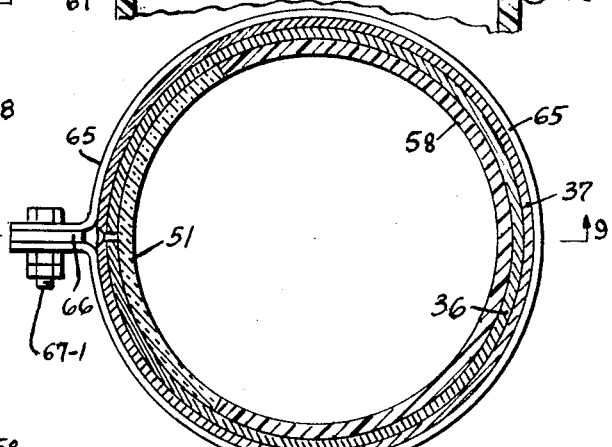

CONTINUOUS ELECTRIC ROASTING OF ELONGATED MEAT STRANDS AND OTHER FOOD STRANDS AND FOOD ROASTING SYSTEMS THEREFOR

This invention relates to oven systems for continuous electric roasting of an elongated meat strand of substantial cross section or width, namely more than 3 inches thick, which is used as resistance and is thereafter subdivided into section of desired length.

The heretofore known meat strand cooking systems have been able to roast uniformly only very comminute meat emulsions in strands not more than 2 inches thick, and this with the use of high frequency current. If such roasting system had been used for roasting strands of meat not comminuted, embodying larger meat chunks and formed in thick strands such as 3 to 6 inches, enormous difficulties would have been encountered. In a seemingly well roasted horizontally advanced thick meat strand some parts of the meat would be overcooked and other parts would be half raw. Also the taste of the different strand parts would be unequal. Some strand parts would taste well and others would have been dry cooked. Some parts of the meat strands would have a metallic taste from the heating electrodes or a bad "electric" smell or burned meat smell from arcing at the cooking electrodes.

For the widely used meat sausage rolls of 4 inches to 5 and 6 inches in diameter or thickness embodying large meat chunks there has not been heretofore available a reliable and satisfactory method or system for roasting on a continuous basis. Such large cross sections meat rolls must still be cooked for 5 hours in water or roasted for 8 to 9 hours in convection ovens. This requires much manual work and has various shortcomings as excessive juice discharge which lowers the yield of the oven roasted product and lowers the value of the water-cooked product.

There are many difficulties connected with roasting meat sausage rolls of increasing diameter. The time necessary for equalizing the radial temperature differences in an electrically heated thick meat sausage increases with the square of its diameter. The instability of uniform electric heating current distribution in a thick meat sausage increases with the square of its diameter. The instability of uniform electric heating current distribution in a thick meat sausage increases with the square of the sausage diameter. The consumed electric energy for equal length of the sausage increases with the cross section, i.e. the square of the diameter of the cooked meat body, but the electrode surfaces which supply the heating current to the thick sausage increase only linearly with the diameter of the sausage.

The nonuniform electric cooking of thick meat sausages results from the so-called "current channeling," i.e. the nonuniform distribution of the heating current flow through the cross section, with the electric current flowing preferentially along a few paths of the meat sausage having lower resistance than others. The basic cause of the low stability of current distribution and current channeling is the strong dependency between conductivity of meat and its temperature. A temperature rise of 1° C. raises the conductivity of meat about 2 percent. As the conductivity of the path improves, it draws more of the available current which serves to further increase its conductivity. Hence, the electric conductivity of the heated material should be as homogeneous as possible.

The differences of the conductivity in the meat strand are partly primary, present already in the cold strand or secondary, generated by current flow or heating. The primary differences are caused by air bubbles, lumps of fat and unequal salting. They have to be lowered by proper meat preparation before heating. Secondary differences of conductivity are caused by gas bubbles on electrodes and by steam and juice produced by heating. They have to be suppressed or equalized by design and work of the heating system.

The adverse effect of the steam and juice shall be explained on a thick meat strand such as 4 inches in diameter moving in a horizontal heating tube and heated by ring-shaped surface electrodes. In a thick horizontal meat sausage, steam escaping from heated meat rises up and condenses on the layer of meat near the wall in the upper part of the heater tube. This outer meat layer becomes more moist and hotter and therefore better conducting. If the current flows parallel to the horizontal axis of the moving sausage roll, i.e. parallel to its said better conducting layer, a part of the remaining current follows into it. The meat parts carrying higher current become hotter. Their conductivity rises again proportionately with the increase of temperature and this pulls more current from the immediate vicinity. That repeats further and finally a thin string of meat in the sausage product starts to boil although other parts of the thick meat strand are much colder.

At about 150° F. meat starts to coagulate and to discharge juice. This juice, under the influence of gravity, trickles down through the shrunken meat parts and collects in the lower meat layers. It increases their conductivity and pulls in current from the center in a similar way as at the top and with the same result; appearance of boiling along narrow paths of meat sausage parts with high current density.

Meat in the center part of the meat roll stays cooler and cooks much slower. The parts of meat from which the juice has trickled out cook dry and have an impaired taste. When the roasting is prolonged until the center is well done, the outer better conducting meat parts will be overcooked and lose more juice than desirable. The current channeling and the resulting difficulties cause unequal heat distribution which increases with the cross section of the heated meat strand, i.e. with the square of the diameter.

The invention overcomes the described difficulties by means of such new measures:

The heater tube is nearly vertical, at least its second half, where juice and steam develop. That keeps the steam and juice in the moving meat strand uniform. It is radially distributed and removes one of the primary causes of current channeling. Vertically upward movement of the meat strand in the heater tube holds up the discharged juices and prevents their outflow from the meat and protects the meat against electric dry-cooking which would spoil the meat taste.

The last quarter length of the heater tube has a slightly converging shape. It prevents formation of a slit between the tube wall and slightly shrinking moving meat strand which if filled with juice would cause current channeling.

The invention secures homogenizing of the electric resistivity of the raw meat fed into the heater tube. That reduces the differences in meat conductivity which would cause or support current channeling.

The heating electrodes are disposed along the heater tube to cause the heating current to pass transversely in different radial directions through successive vertical portions of the meat strand moving through the heater tube.

The heater electrodes used for heating the thick meat strand as it is advanced through the heater tube, or at least the most inward end sections of each heater electrode are made of artificial graphite to assure that the meat taste is preserved and to prevent formation of gas foam on the electrode surfaces which could disturb the homogeneous distribution of the heater current to the meat strand.

The heating temperature applied for roasting the meat in the heater tube is regulated by changing the speed at which the meat strand is advanced to the heater tube while keeping the adjusted heating-current density at the electrode surfaces constant at all times. Such roasting of the moving thick meat strand prevents arcing along the electrode surfaces which would spoil the meat smell.

The heater tube is combined with a thermally insulated tenderizing tube, into which the roasted meat strand passes after leaving the vertically highest level of the heater tube. The tenderizing tube prolongs the time during which the roasted meat strand retains its temperature, thereby raising the tenderness of the meat in the fully roasted portions of the meat strand.

One or more steam relief outlets ending over the roof are provided at the vertically highest level of the meat roasting system to prevent steam pressure buildup during roasting of the meat strand.

Ordinary low frequency alternating heating current such as 60 c.p.s. alternating current can be used for roasting the continuously advancing thick meat strand.

Too high heating current density and accidental arcing at the electrodes as a result of accidental higher local salt contents is prevented by current limiting action of constant current transformers or saturated reactors controlled by current increase above normal.

The apparatus of the invention makes the electric resistance heating fully reliable and usable for industrial roasting of continuous thick meat strands having 3 to 6 inches in diameter or width.

A more complete understanding of the instant invention may be gained by reference to a detailed description of the invention taken in conjunction with the accompanying drawings in which;

FIG. 1 is an elevational and partially diagrammatic view of a meat strand or other foood-strand cooking system exemplifying the invention;

FIG. 2A is a diagrammatic view of the one type of over current protective unit of the circuit of FIG. 2;

FIG. 2B is a diagrammatic view of a sample of a speed regulating unit of the circuit of FIG. 2;

FIG. 3 is a similar view of its cutoff device;

FIG. 4 is a longitudinal cross section view of a vertical heater tube length of the systems of FIGS. 1 and 2.

Figure 12:
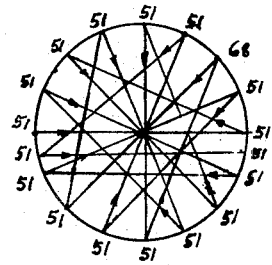

FIGS. 5, 6, 7 and 8 are cross-sectional views along lines 5-5, 6-6, 7-7, and 8-8 of FIG. 4;

FIG. 9 is a cross section view similar to FIG. 4 showing enlarged part of a heater tube length;

FIG. 10 is a cross section view along lines 10-10 of FIG. 9;

FIG. 11 is a cross section view similar to FIG. 9 showing the tube length provided with a closed ring heater electrode;

FIG. 12 is a diagram showing a transverse view such as FIG. 10, the projected relations of the current vectors along which the current flows in the system of FIGS. 1, 2, 4, 9 and 10;

FIG. 13 is a cross-sectional view of a length of a heater tube operating with a succession of overlapping heater electrode pairs, with the electrodes of each pair held either wholly or partially at the same level of heater tube and FIGS. 14, 15, 16 and 17 are cross-sectional views along the lines 14-14, 15-15, 16-16 and 17-17 of FIG. 13; and FIG. 18 is a view similar to FIG. 4, operating at some levels of the oven with ring electrodes and at other levels with longitudinally overlapping electrode pairs, showing also the associated supply circuit.

In the drawings some dimensions are exaggerated for clearer showing.

An example of an electric food roasting process and system of the invention will now be described in connection with FIGS. 1 to 12. Although this food cooking process and system is applicable to other types of foods, special problems are presented in roasting or cooking a continuous strand of a thick meat product having a wide cross section or diameter of at least about 3 inches and higher such as 4 to 6 inches in diameter which is thereafter cut into correspondingly thick meat rolls about 15 inches long. Such 15 inch long meat roll is usually kept under refrigeration and sliced into eating slices, in the meat store, for instance.

As used herein "meat" means all kinds of meat, such as beef, turkey, poultry and the like, and includes seasonings distributed throughout such meat.

The meat used for making the thick meat rolls by the method and system of this invention may consist of meat chunks or pieces such as 1 or 2 inches long and smaller ground meat pieces.

Figure 2:
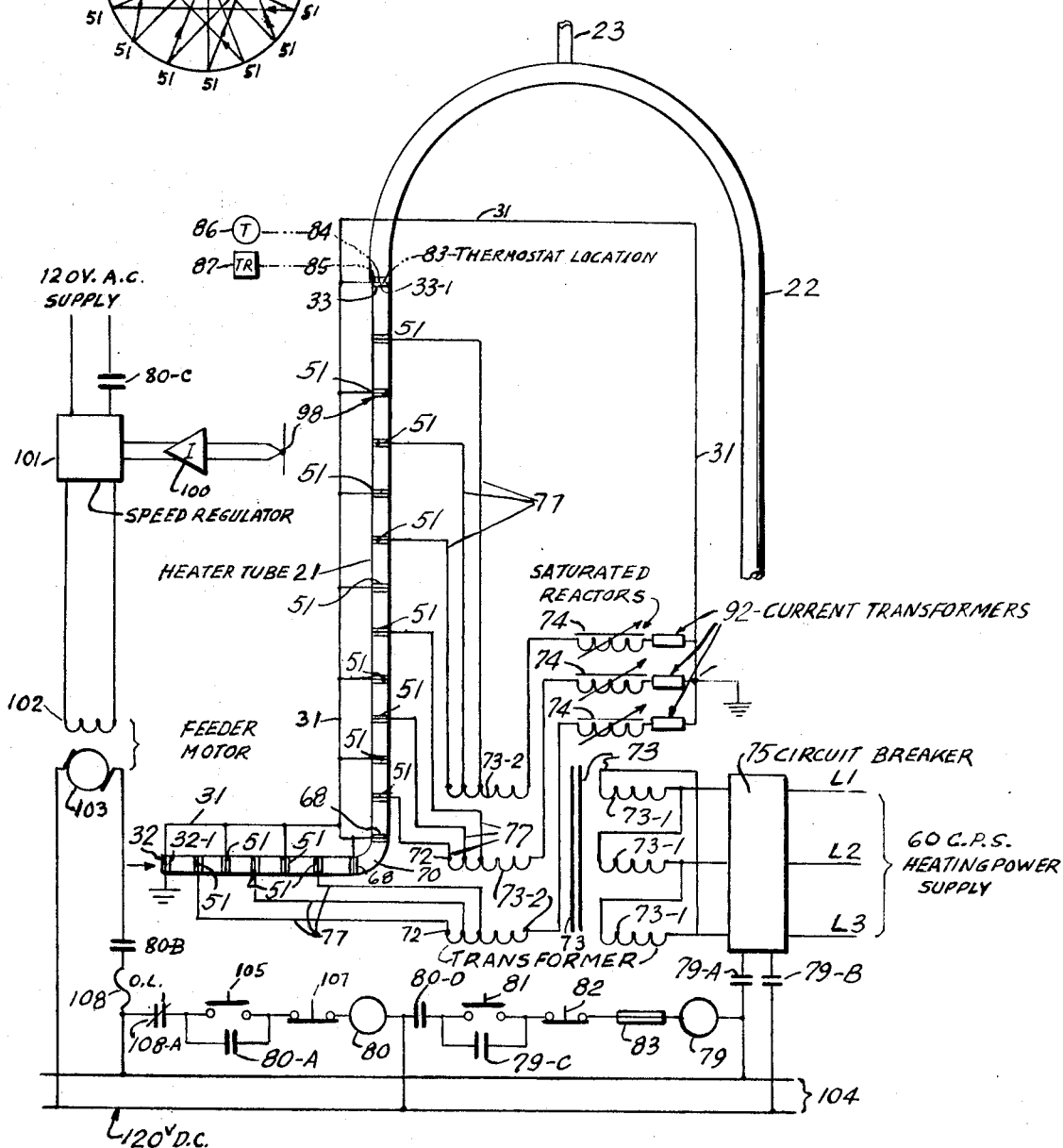
FIG. 2 is a similar more diagrammatic oven system together with an example of its electric supply circuit.

FIGS. 1 and 2 show my example of the electric cooking system which is effective in continuously roasting such thick meat strands, which after being properly roasted in cut into meat roll lengths.

Referring to FIG. 1, an electric heater tube 21 extends in a generally vertical direction for advancing in its internal passage a meat strand of the to-be-roasted meat from its lower entrance opening 32 to the vertically upper end 33. FIG. 2 shows that such electric heater tube 21 may have an initial horizontal length followed by a substantial length extending generally vertically to its upper vertical heater tube end 33. As an example, in the heater tube 21 of FIG. 2 the first quarter thereof may be horizontal and the major length thereof vertical, to keep its top end below the ceiling.

The shape of the heater tube depends upon desired shape of the finished product. The tube shape may be circular, oval, square or rectangular or quadrangle. These last shapes are desirable especially for products which are to be sliced, smoked and permanently wrapped after leaving the tenderizing tube.

In heater tubes intended for roasting of fine meat emulsions only, the diameter of the heating tube can be equal in their whole length because the shrinkage of these meats is quite small.

The heating tubes intended for roasting meats containing larger chunks, the width of the heating tube is in its first three-quarters about 4 percent larger than the desired width of the product. From there, i.e. in the last quarter of the heater tube length, the width decreases conically to the vertically upper end of the heater tube which has the width of the finished product. Such conical shape keeps a tight fit of the meat strand with the tube walls in spite of the radial shrinkage of the strand during coagulation, and prevents the filling of the slit with juice, which would constitute a lower resistance and cause current channeling.

The heating tube is made of electrically nonconductive material resistant to heat, chemical corrosion and sufficiently strong to sustain the inside pressure. Such material may be the known fluorocarbon polymers, for example polytetrafluoroethylene or polychloro trifluoroethylene, see *Textbook of Polymer Science* by F. W. Billmeyer Jr. Copyright, 1962. The strength of the heater tube 21 may be increased by another layer of glass reinforced plastics, e.g. polycarbons. Good results were also obtained with a fused quartz as material for the heater tube.

To the heater tube 21 there is connected by a bent tubing passage a long discharge tubing 22 extending vertically downward. Both are on the outside thermally insulated and serve to tenderize successive portions of continuous meat strands forced through the passage length of the heater tube and moving therefrom through the passage of the tenderizing tube. The tenderizing tube 22 may be formed of metal such as aluminum, the interior surface of which is coated with a fluorocarbon coating. These fluorocarbon polymers have the advantage of providing low friction flow resistance and repellency to the contents of the advanced strand. The thermal insulation, preferably plastic foam, is on the outside of the whole tenderizing tube 22. It prolongs the action of the heat upon the advanced meat strand. The inside diameter of the tenderizing tube 22 is equal to that at the end of the heater tube 21. Vertical position is not essential for the tenderizing tube. The radius of the bend tube connection to the tenderizing tube 22 must be sufficiently large so as to pass the stiff cooked meat strand easily through, without substantial bending.

The raw meat is supplied to mixer vessel 24. Raw meat must be prepared so that its conductivity is sufficiently homogeneous. Therefore, fat and skin (if used) have to be very firmly comminuted, skin preferably milled. Both of these, also the salt and other seasonings, must be very uniformly distributed in the meat. The mixing must be done without the presence of air, to prevent the formation of air bubbles in the meat. Air from the mixer 24 is driven out by steam and/or sucked out by slight under-pressure with an exhaustor, 24-A (FIG. 1).

The ready mixed meat is forced by pump 25, which pumps it into pressure receiver, e.g. the known stuffer 26, and by a feeder, e.g. the known screwfeeder 27, which continuously feeds into the passage of heating tube 21 a continuous thick meat strand. The feeder may be driven by variable speed motor 28 which controls the speed at which the meat strand is continuously advanced in vertically upward direction through the heater tube 21.

The feed pressure on the meat in the stuffer 26 shall be exerted without any contact of meat with air, for example by a piston 29 forced by water or compressed air 30. This pressure equalizes the variable pressure of the meat pump 25, which advances meat strand through the heater tube 21 and tenderizing tube 22 against mechanical friction resistance. For advancing turkey meat strands without added water, when starting, the initial friction at rest is 0.12 lb. per square inch of the wall surface of the tubing. When moving, the friction is about 25 percent less. To prevent pressure buildup from the small quantity of steam produced while roasting the moving meat strands, at least one vent tube 23 is provided at the beginning of the tenderizing tube 22 for venting the steam over the roof of the building.

The heating tube 21 may consist of a plurality of tube sections connected together by means of couplings, into which they may be screwed in and/or bonded to by special plastics, e.g. epoxy resins. This division of the heating tube into pieces is desirable for providing it with the heating electrodes which are located in the heating tube 21.

Distributed along the length of the heater tube 21 are a plurality of longitudinally displaced electrodes for continuously heating the meat strand as it is advanced from entrance of the tube to the vertically highest heating tube level 33, for assuring that portions of the meat strand are fully cooked before leaving level 33.

Also in the example shown on FIG. 2 is the heating tube 21 which is provided with an array of heater electrodes distributed along its length as described below.

At the left entrance 32 of the horizontal section of the heating tube 21 (FIGS. 1 and 2) into which the meat is forced by feeder 27 (FIG. 1), there is shown a heater electrode 32-1 which is of tubular (ring) shape and defines the entrance opening of heater tube 21. Distributed and longitudinally displaced along the heater tube are a plurality of heater electrodes 51, which in the example shown constitute only an arcuate segment of the tube portion in which they are affixed. At the both ends of tubular elbow connection 70 between the horizontal and vertical tube length 21 are provided tubular (ring) heater electrodes 68 which likewise form part of the heater tube 21. At the vertically upper end of the heater tube 21, there is likewise provided a tubular (ring) heater electrode 33-1 which also forms the upper end 33 of the heater tube. Through these distributed electrodes 32-1, 51, 68 and 33-1, electric heating current is passed through each meat portion of the meat strand as it is advanced upwardly from its lowest heater tube region to the vertically highest end 33 of the heater tube 21 for assuring proper and thorough roasting of each portion of the meat strand leaving the upper level 33 of heater tube 21.

In accordance with a feature of the invention, all these heater electrodes or at least their most inward end sections which engage the moving meat strand, are formed of graphite; the hard industrial or artificially produced graphites have proven highly advantageous for use as the material for these heater electrodes 21-1, 51, 68, 33-1. By using graphite electrodes, the formation of gas bubbles between the electrode surface and moving meat strand is suppressed, thereby assuring uniform electric transit conductivity between the electrodes and the moving meat strand and decreasing the inhomogeneity of the current distribution therein. As an additional benefit, graphite does not affect detrimentally the taste or smell of meat, even after long contact with it.

All heater electrodes are held in the heater tube wall 21 with their inner electrode surface exactly flush with the inside heater tube surface. They are shown connected to electric supply systems. The first heater tube electrode 32-1 and the last heater tube electrode are connected to the grounded end of the electric supply circuit in order to confine the higher applied voltage to the heater tube length between them and thus make the system beyond the heater tube 21 electrically safe.

The form of the electrodes depends upon the diameter and also upon the length of the heater tube 21. The simplest and the most economic are the tubular or ring shaped electrodes driving the current mostly axially. Their mechanical design is shown in FIG. 11. Each heater tube section has nonconducting tube section 34 and short graphite tube 51-2 serving as an electrode. The outer surface of each graphite electrode, such as 51-2 is engaged by a warm impressed metallic tube 36 which is surrounded by a metallic coupling tube 37, of stainless steel for example, the opposite end of which is affixed to the surrounded heater tube sections 34 by a bonding junction such as epoxy resin.

Tubular spacer rings 39 serve to maintain equal distance between heater tube sections 34 and the coupling tube 37. If required, a conductive connection as by a screw 35 is made between the inner hot pressed metallic contact tube 36 and outer metallic coupling tube 37. Assuming the use of such ring shaped electrodes as indicated in FIG. 11, in the heater tube section between such electrodes 51-2, the electric current density is practically homogeneous, except in the space approximately between the two conical parts 40 (FIG. 11), based on end edges of the electrodes, where the density near the center around the axis is much weaker than at the periphery. If meat which is not moving is heated by such electrodes, the mean temperature in the central part of these conical parts 40 is significantly lower than in the heater tube section outside the conical parts 40. In moving meat strands, this temperature difference is distributed upon the whole distance between two such neighboring ring electrodes. As a result, the temperature in the center of the meat strand is lower than on the periphery. The difference depends upon the diameter of the heating tube and upon the distance between successive electrodes. It decreases with the distance of the electrodes, but increases with the diameter of the heater tube 21.

In accordance with the invention these disturbing temperature differences are suppressed by driving at least a part of the heating current through the center of the meat strand moving in the heating tube 21. There are various alternative ways possible for achieving that. Below are described two examples of means for driving a part of the current through the center of the meat strand moving through the heater tube 21. One of these means is segmental electrodes. Segmental electrodes 51, shown in detail in FIGS. 9 and 10, are similar to the ring shaped electrodes shown in FIG. 11. The difference is that only one segment of the ring is of graphite, another is of insulator, preferably of the same insulator as the main body of the heater tube 21. Both segments are held together by a press ring 36 (FIG. 9 and 10). The manner of mounting these segment electrodes between successive heater tube sections shown in FIGS. 9 and 10 may be the same as described with ring electrodes shown in FIG. 11.

FIGS. 4 to 10 show the heater tube 21 provided along different longitudinally displaced portions thereof, with segmental heater electrodes 51. As seen in FIG. 4 and 9, the vertically higher heater tube section 34 is adjoined by a segmental heater electrode 51 and the tubular coupling 37 to the next lower tube section 34 in tube region seen in FIG. 9 and 4. The three vertically next lower heater tube sections 34 (FIG. 4) are adjoined by similar segmental heater electrodes.

Segmental heater electrodes 51 are successive angularly displaced relative to the preceding electrode 51, as seen by the lower heater tube cross sections of FIGS. 6, 7 and 8. Such successive angular displacement of the segmental electrodes 51 applies to all tube sections 34 which form the heater tube. As a result, the heating current flowing between the two uppermost electrodes of FIG. 4 with the diagonal current vector 53 will have a horizontal component 56. Since the successive electrode segments 51 are angularly displaced relative to the preceding ones, the horizontal components of the current passing between successive electrode segments 51 will be angularly shifted relative to each other as indicated by the succession of such transverse current components seen projected in FIG. 12. It is seen that with such electrode system each succeeding portion of the moving meat strand is heated by an axial current component 55 and a transverse cross component 56 (FIG. 4). The transverse current component shifts with each succeeding electrode or electrode pair by an angle around the axis of the tube 21 (FIGS. 5 to 8) so that along the whole length of the heating tube 21 the transverse current component makes one or more full 360° turns around the tube axis. That assures sufficiently uniform temperature distribution in the meat strand at the upper end of the heater tube.

Current connections to the heater electrodes 51 may be made in any known manner. FIGS. 9 and 10 show an example of such connection. A metallic loop or ring 65 of tinned copper, for instance, is clamped around the metallic coupling 37, held by a clamping screw 67–1, which serves also for affixing thereto the conductor end 66 of an insulated conventional supply conductor 67. Each heater electrode 51 (FIGS. 9—10 and 11) is thus connected through the metallic tubular embracing members 36, 37 and 65 to its supply conductor 67.

What was said above with respect to heater segments 51 used in heater tube 21 and their complementary insulating ring segment 58 shown (FIGS. 5—8 and 10), which form a circular cross section applies also to heater tubes having a rectangular cross section.

In addition to the first electrode 32–1 and the last electrode 33–1 (FIG. 2), the two junction electrodes 68 at both ends of tubular heater tube elbow are ring-shaped (tubular) electrodes 68 (FIG. 2) which are all connected to the conventionally shown ground 88 through grounded neutral conductor 31. The tube elbow is not used for heating the meat strand because the applied electric field there lacks symmetry and also because it is advantageous to make such curved part of the heater tube 21 of metal which may be covered on its interior surface with an adhering layer of known fluoro polymers.

The electric conductivity of meat increases nearly linearly with the temperature and its resistivity decreases reciprocally, i.e., nearly hyperbolically. The meat resistivity at 160° F. degrees, i.e. at the end of the heater tube 21 is about two times lower than at the tube entrance which is assumed to be at 50° F. With the equal distance between segmental electrodes 51 and equal applied voltage between them, the current at the upper end of the heater tube would be two times greater than at the tube entrance. With equal surface of all electrodes, the current density would be proportional to the current, i.e. two times higher at the hotter end of the heater tube 21 than at its cold end. For proper utilization of the heater tube 21, it is important to keep the current density along the whole tube length equally high, but always below 1.5 a./sq. inch mean density, to prevent arcing at the electrode surfaces. To achieve that, it is necessary either to keep the distance of all electrodes equal and decrease the voltage on the hotter electrodes, or to increase the distance of the electrodes in the direction of meat movement, so that the resistance of all sections between electrodes becomes approximately equal. The second possibility affords less electrodes and tube sections, requires simpler transformer and utilizes more equally its windings. Therefore, it is used in this invention.

If the heater tube 21 has "N+1" electrodes and N heating tube sections, the distance between the two first electrodes is "A" and the distance between the two last electrodes "2A," then the rate of distance increase between any two neighbor electrodes shall be $\sqrt[N]{2}$ (the Nth root of 2). It is desirable to have an even number of tube sections, and for three phase heating current, preferably divisible by three.

The progressive increase of the length of the heater tube sections equalizes approximately the resistance of their embraced part of the meat strand and the heater current flowing between the respective electrodes. Further equalizing of the current is possible through taps 72 on the secondary of the heating transformer 73 described later. Such tap adjustment could be necessary only for initial adjustment of the heating current.

The heating of the meat strand can be regulated through changes in the advancing speed of the meat strand or generally the heated product. This may be done by the regulation of the speed of the feeder motor 28. At higher speed of the meat strand, its temperature becomes lower, at lower speed higher. This is important because it maintains the current in each circuit and current density at the heater electrodes practically constant, once it is at a high but still safe value. Thus, if temperature of the meat strand is too high, the speed of the meat strand is increased without lowering the heating thereof. This permits better utilization of the oven system. At the too low temperature only the speed of meat strand has to be lowered. There is no need to increase the heating current and its density at the risk of electrode arcing. This prevents unpleasant smells of "electric" or "burned meat" in the product which are more difficult to avoid if the temperature regulation is based on current changes.

In accordance with the invention the heating current is kept constant, even if the resistance of some of the meat strand sections should drop. Such drop is possible in case of accidental higher salt content in the meat through mistake or insufficient mixing. The conductivity of meat is closely dependent upon its salt content. Even mild oversalting which leaves meat still tasty and usable, may cause an increase in its conductivity and current so that the current density at the heating electrodes becomes too high and arcing occurs. To suppress such difficulties, quick automatic current limiting is necessary.

Any known system for maintaining the current in a load, such as presented by the moving meat strand, may be used for maintaining the heating current constant. For example, a heating current generator with regulated excitation, also a constant current transformer or saturable iron-core reactors may be utilized (see Knowlton, *Standard Handbook for Electric Engineer*, 9th Edition of 1957, Section 6, paragraphs 124—137, and 142).

FIG. 2 and related FIGS. 2A and 2B show one basic example of an electric current supply system for an electric cooking system of the invention.

The electric heating current is shown delivered from the distribution frequency (60 c.p.s.) three phase supply lines 73–A through a known circuit breaker 75 to heating transformer 73. The primary windings 73–1 of the transformer 73 are shown delta connected and its secondary windings 73–2 are open star connected. Taps 72 on the secondary windings 73–2, supply through electric feeder lines 77 "hot" electrodes of the heater tube 21. The "cold" electrodes are connected to grounded neutral conductor 31. Thus the whole meat supply conductor system is divided into N parallel circuits, all with one common grounded neutral 31.

To prevent starting of the heating before the meat strand is moving, the circuit breaker 74 is interlocked electrically with the circuit of the meat feeder motor 28. Circuit breaker 74 is controlled, for instance, by the 120 Volt DC supply connected to the breaker through contacts 79A and 79B of relay 79. In series with relay 79 are normally open contacts 80–D of the relay 80, which close or open the circuit of feeder motor 28. Only when contacts 80–D are closed, will the pressing on the pushbutton 81 energize relay 79 and close its locking contacts 79C and contacts 79A and 79B, which close circuit breaker 75.

The circuit breaker 75 interrupts the supply when relay 79 is deenergized, either manually by pressing the pushbutton 82, or automatically at a temperature such as 190° F., by opening a bimetal thermostat 83. This thermostat is located at the vertically highest heater electrode 33 and serves as protection in the case of failure of the automatic speed regulation.

In the vertically highest electrode 33, or just near or above electrode 33, are the temperature sensing elements of electric thermometers which may consist of thermocouples 84 and 85 connected with dial thermometer 86 and temperature recorder 87.

In the general arrangement of FIG. 1, the supply conductors of the heating current 77 and 31 are held in a conduit 31–C (FIG. 1).

As protection against overcurrent in the heating tube system, three series saturated reactors 74 may be used. In order to have the transformer taps available for adjusting the current in pairs of heating circuits, each reactor is connected not to the outside end of the phase winding of the transformer but between one phase winding of the transformer and the zero neutral point made by connecting the other ends of all reactor windings to the common neutral point 88 (FIGS. 2, 2A).

The basic connections of one of the three variable saturation reactors are shown in FIG. 2A. The electromagnetic core 89 of the reactor is normally saturated by the direct current flowing from the constant voltage direct current supply 90 through the core winding 91 around the middle yoke of the core. Windings 92 carry the full heating current to be regulated of one phase of the heating transformer 73. Between the reactor winding 92 and zero point 88 is included a primary of a small series transformer 93 of known type current transformer. The voltage and current induced in the secondary of current transformer 93 is proportional to the heating current. This induced current is rectified by the full wave rectifier-bridge 94 and the resulting direct current flows through another DC winding 95 on the middle yoke of the core 89. The rectifier bridge current through central core windings 95 works in an opposite direction to that of the adjacent constantly magnetizing winding 91. Both DC circuits include variable resistances 96 and 97 for adjusting their currents so that the field of winding 95 is never stronger than the field of the constant current magnetizing windings 91, and so that when the heating current has its desired value, the core magnetization through winding 91 prevails and just saturates the reactor core. The reactance of the reactor system is then quite small and the secondary voltage of the heating transformer 73 supplied the constant heating current on the electrodes of the heater tube with only small losses.

If the resistance drops in some part of the heater tube circuit, fed by one of transformer phases, the heating current in this phase will correspondingly tend to increase. This will simultaneously increase the induced direct current in demagnetizing windings 95. If the saturation of the core 89 falls, its reactance rises and keeps the heating current down to the desired level.

When more than one cooking system, such as shown in FIGS. 1 and 2 are to be fed from one common transformer, each heater circuit system should have its own nearby located current limiting reactors. If for better utilization of the heater system fine initial balancing of its circuits for equal current in each heater circuit branch is desired, additional small, tapped reactors may be connected in each phase for this purpose; or in heating tube circuits of too low resistance, small equalizing reactors could be added.

The speed at which the meat strand is advanced in the heating tube depends upon the speed of the meat feeder motor 28, which is controlled automatically by the temperature of meat, as sensed by an electric thermocouple 98 (FIG. 2). The thermocouple is located vertically below the top of the heater tube 21, preferably at the height of the next second lower grounded electrode. The thermocouple 98 is connected with a known type inverse amplifier 100. This amplifier 100 sends its output to the automatic regulator 101 which delivers a changing DC current to the excitation windings 102 of the DC motor 28, driving meat feeder 27. The armature 103 of this feeder motor 28 is driven by the DC current, taken from the DC power supply 104 with constant voltage, for instance 120 Volt.

Feeder motor 28 is started by pressing start pushbutton 105 which energizes the relay 80, Relay 80 closes its locking contacts 80–A, the contacts 80–B in the armature circuit of the motor 28, contacts 80–C in the circuit of the speed regulator 101 and the previously mentioned interlocking contact 80–D in the control circuit of the circuit breaker 75. Closing the contacts 80–B and 80–C starts the feeder motor 28 and closing contacts 80–D enables the starting of the heating action by pressure operating pushbutton 81.

The feeder motor 28 is stopped either manually by pressing pushbutton 107 or automatically by overload relay 108 which opens the contacts 108–A. That deenergizes relays 80 and 79 and interrupts the heating current.

Automatic regulation of the speed of the motor by the temperature of the thermocouple is known and widely used in the industry. One possible type of regulation of the feeder motor 28 by the temperature is shown in FIG. 2–B. Thermocouple 98 in the heater tube 21 is connected to inverse amplifier 100. Amplifier 100 sends its DC output to the middle yoke of the saturated reactor 109 and changes its saturation and thus also reactance. Reactor 109 is connected in series with 120-volt secondary winding 110 of the transformer 111 and the full wave rectifier 112. The rectified voltage drives the current through the excitation windings 102 of the meat feeder motor 28 in accordance with temperature sensed by the thermocouple 98. Variable resistance 113 permits adjustment of the motor speed at which the thermometer 86 on the top of the heater tube will show the desired end temperature of the roasted meat strand passing therethrough.

The fully roasted meat strand is a coherent, continuous, mostly 3 to 6 inches thick meat cylinder, from which individual, about 15 inch long pieces "rolls" are cut off, or which can be directly sliced, smoked and wrapped. The rolls are cut off in the thermally insulated cutoff box 114 (FIG. 3) by, for instance, a rotating disc blade 115 sitting on a shaft 116 driven continuously by a gear 117 of a motor 125. During the cutting process the rotating blade 115 moves down, pulled by the meat strand 118 so that the cut surface is at right angle with the longitudinal axis of the meat roll. The knife blade can be pushed by its bearing 119 horizontally into the meat, either manually or, for instance, electropneumatically. In the latter case, the blade 115 is pushed into the meat cylinder 118 by compressed air driven piston in cylinder 120. This piston movement is electrically actuated by the downward end of the moving meat strand which triggers lever operated switch 121. The rotating knife blade 115 is mounted so that it can travel with its shaft 116 up and down. When cutting through the meat, it is released from the pull of its lifting solenoid 122 and pulled down along in the direction of the meat-strand movement. When the case of the motor gear 117 moves rightward, as seen in FIG. 3, it closes contacts 123, causing piston in cylinder 120 to be driven by air in opposite direction 124 and pulls the rotating knife 115 away from the moving meat strand. Motor enclosure 125 actuates switch 126 to cause solenoid 122 to pull the knife 115 upward to its uppermost position shown in FIG. 3. Air pressure cylinder 120 and solenoid 122 are controlled, for instance, by the press air distributor 127, actuated by low voltage current supply, such as 24 volts through wires 121–A, 122–A, 123–A and 126–A.

The severed off meat rolls fall off the meat strand by gravity and by the push of the subsequently cut meat rolls through funnel 128, and then is drawn into sterilized shrink casing 129. The air escapes through a thin tube 130. At this point all phases of the cooking process terminate. Further handling such as sealing, cooling, labeling, packaging, is done by conventional methods.

The just-described system has shown segmental electrodes as one example of means for driving a part of the heating current through the center of the upward advancing meat strand in order to secure sufficient heating of its central region.

Another example of such means are the overlapping pairs of heating electrodes shown in FIGS. 13 and 14 to 17.

FIGS. 13 and 14 to 18 show heater systems of the invention operating with overlapping pairs of heater electrodes of opposite polarity 51–A and 51–B, with a plurality of such sets of electrode pairs longitudinally displaced along the length of the heater tube 21-2 in FIG. 13. The heater tube 21B consists of successive tube sections 34B analogous to the tube sections 34 of the system shown in detail in FIGS. 4 to 10 which are similarly joined to each other into a continuous heater tube 21B. In each electrode pair 51–A and 51–B both electrodes are located at the same level or height of the heater tube 21–B and diametrically opposite to each other. The diameter of the heater tube is also the axis of the inward electrode faces of each electrode pair 51-A, 51-B, and centerline of the highest current density of the current flowing between both electrodes. The axis of all these electrode pairs 51-A, 51-B are shifted angularly against each other. Central parts of meat strand moving up near the axis of the heating tube passes all those higher density current zones of cross current and are heated more than the meat parts moving nearer to the wall of the heater tube 21-B and passing fewer of the high current density zones.

In heater tubes with circular cross section with equal axial distance of the electrode pairs 51-A, 51-B and equal shift angle of successive electrode pairs against each other, the electrodes 51-A and 51-B of FIGS. 13 to 17 lie on two helixes shifted by 180° relatively to each other. The electrodes 51-A and 51-B of such electrode pairs are then inclined to the axis of the heater tube 21-B. This angle may be such as 30°. Their ends may be displaced 180°, i.e. half inside circumference of the heater tube 21-B. The linear length of each electrode 51-A, 51-B along its helix is then equal the whole ring circumference of the tube 21-B and their axial length one half of square root of 3=0.865 of the circumference.

Such overlapping electrode pairs 51-A, 51-B should be only so wide that the lateral spacing between each pair measured on the interior surface of the heater tube 21-B is not smaller than the interior tube diameter, in order that more current should flow through the center of the meat strand than along the exterior layer of the strand. Each such electrode 51-A, 51-B can be made of either one piece of graphite or of several, smaller pieces located in equal distances and connected by screws 43 (FIGS. 13 and 14) to an inside metallic strong base plate 44 (FIGS. 14 and 15). Such base plate 44 is provided with welded on screw bolts 45 (FIGS. 13 and 15) which serve for connection with current supply cables. Base plates 44 and screw bolts 45 may be made for instance of tinned copper or of stainless steel with or without tin coating. The segments of the heating tube are connected by bonded couplings 37, such as used with the electrodes of FIGS. 4 to 10 and bonding material 38.

Such overlapping electrode pairs 51-A, 51-B heat the center of the moving meat strand more than its exterior layers. Their combination with ring electrodes permits the achievement of equal temperature distribution near the top of the heater tube 21-B. An example of such arrangement is used in heater tube 21-C, with only a fraction of its full length being shown in FIG. 18. Heater tube 21-C has four closed ring electrode sections 49, and two overlapping electrode sections 50, serving to cook successive portions of the advancing meat strand.

The distance between electrodes 51-A, 51-B in overlapping electrode pairs 51-A, 51-B is relatively small, approximately equal the diameter of the heating tube. Therefore, the resistance of the passing meat-strand portion is low. To keep the current density on these electrodes in allowable limits, the voltage applied between electrode pair 51-A, 51-B must be low. Since the heating power of overlapping electrode pair depends upon the square of the tube diameter, they are more efficient in heater tubes with larger diameters. Heater tubes with small diameters, such as 3 to 4 inches requiring smaller temperature difference equalization, permit use of more ring-shaped electrodes and require fewer overlapping electrodes. Heater tubes with larger diameter, such as 5 inches and larger, require more cross overlapping electrodes and fewer ring-shaped electrodes.

Without thereby limiting the scope of the invention, there are given below data for the practical construction of the meat-strand heater system of the invention using segment electrodes.

A smaller oven for continuous roasting meat strand of poultry meat 4.5 inches thick, requires for proper cooking thereof a heater tube (such as 21 in FIG. 2) 4.5 inches in its upper end diameter, 18 feet long, with 14 heating circuits, passing the meat strand, with segmental electrodes 51 (such as seen in FIGS. 1 and 2). Distance between electrodes is 8 to 16 inches. At 200 Volts AC supply, power consumption is 32 kilowatts.

To maintain the strand temperature at the vertically highest heater tube level at 162° F., the mean advancing speed of the meat strand is about 30 inches per minute, with an output per hour of 120 meat rolls of 8 pounds each, or 960 pounds cooked meat per hour.

Usually there will be a plurality of such tubular ovens working together. Then the mixer, meat pump and pressure receiver may be common, and the speed of meat in the individual heating systems may be regulated by separate feeders.

The system of the invention makes it possible to roast uniformly and reliably with high speed bulky meat products of 3 to 6 inches diameter which heretofore had to be roasted in convection ovens. The system of the invention suppresses deterioration of meat parts through excessive drying, gives high yield since less juice is discharged and practically no juice evaporates or has to be discarded.

The system of the invention has been developed to meet the needs of the meat industry and it has been described in connection with roasting of meat products. This roasting system of the invention are also applicable for analogous heat treatment of thick strands of other food products as fish, some cheeses, vegetables, thick fruit jams, compacted pet foods and even for heat treatment of nonmiscible moist chemicals. It is also applicable for small cross sections, which present less difficulties than the large.

Although specific embodiments have been described in connection with the invention and specific examples given, various modifications may be made without departing from the scope thereof as claimed herein.

I claim:
1. In a meat cooking system for producing roasted meat sections from an elongated food meat strand consisting principally of
   a. means to distribute meat seasonings throughout said meat strand;
   b. an elongated heater tube having a certain substantial tube length length extending in a generally vertical direction and a tube passage along which said strand is advanced from a vertically lower to a certain higher level;
   c. a further tube joined with its further passage to said heater tube beyond said higher level, for further advancing said meat strand, and subdividing elements for subdividing this strand into sections of lesser length as said strand is advanced past said further tube;
   d. input control means connected to the inlet end of said heater tube causing a body of meat to be forced into the heater tube and advanced as a continuous meat strand through the passage of said heater tube with a substantial length in a generally upward vertical direction;
   e. said heater tube having a plurality of conductive electrodes insulatingly held, displaced longitudinally along said heater tube with at least a certain quantity of said electrodes being longitudinally displaced along said vertical tube length;
   f. electric supply system connected to said electrodes causing electric current supplied to said electrode to pass electric heating current through successive sections of said advancing meat strand and causing all strand portions reaching said higher level to achieve a certain equal high temperature level,
   the end of said heater tube having the last part of the vertical tube length adjoining said higher level having a smaller cross-sectional area than the vertically lower tube portion, causing successive portions of said strand to fill the passage cross section of said converging vertical tube length as the strand undergoes shrinkage while being roasted in advancing to said higher level.

2. In a meat cooking system as claimed in claim 1,
each of said electrodes having a graphite face exposed to said tube passage and held in contact with the advanced meat strand.

3. In a meat cooking system as claimed in claim 1, said electric supply system including current magnitude control means responsive to current level changes and operating to prevent the supplied heating current from exceeding a certain selected level irrespective of changes in electric resistance in the circuits including portions of said strand passing between said electrode faces.

4. The meat cooking system as claimed in claim 3, said current magnitude control means including reactor windings having a saturable magnetic core for limiting current rise above a certain selected maximum current.

5. In the meat cooking system as claimed in claim 3 said current magnitude control means including a current transformer.

6. In a meat roasting system as claimed in claim 1 wherein at least a plurality of said longitudinally displaced electrodes have said exposed electrode faces confined to an area of the tube passage periphery for causing current flow to pass at least partially transversely through the advancing meat strand, and means for confining the voltage to the inside of the heater tube by grounding of the first and last electrode.

7. In a meat roasting system as claimed in claim 1,
further including temperature sensing elements along said heater tube responsive to the strand temperature;
said input control means including a speed control element operatively responsive to said temperature sensing element for varying the strand-advancing speed in a manner maintaining the strand temperature at said higher tube level at a certain selected temperature level.

8. The meat cooking system as set forth in claim 1, wherein said heater tube is adapted to receive and cook a meat strand having a diameter in excess of 3 inches.